United States Patent [19]

Griswold et al.

[11] Patent Number: 4,501,559

[45] Date of Patent: Feb. 26, 1985

[54] BASIC COMPREHENSIVE GENEALOGICAL AND FAMILY HISTORY SYSTEM OF STRAIGHTLINE GENEALOGY

[76] Inventors: Beth H. Griswold; Gail E. Griswold; Alexandra F. Griswold, all of 767 Acacia Ave., Melbourne Village, Fla. 32901

[21] Appl. No.: 364,683

[22] Filed: Apr. 2, 1982

[51] Int. Cl.³ ............................................. G09B 29/00
[52] U.S. Cl. .................................. 434/154; 283/66 R
[58] Field of Search ............. 434/154; 283/1 A, 66 R, 283/66 A

[56] References Cited

U.S. PATENT DOCUMENTS

| | | | |
|---|---|---|---|
| 527,261 | 10/1894 | Bailey | 283/66 A |
| 699,799 | 5/1902 | Guild | 283/66 R |
| 1,058,859 | 4/1913 | Gray | 434/154 |
| 1,098,833 | 6/1914 | Olinger | 283/66 A |
| 1,447,279 | 3/1923 | Carson | 283/66 R |

Primary Examiner—William H. Grieb

[57] ABSTRACT

This Basic Comprehensive Family History and Records System or Straightline Genealogy is designed to simplify the recording, numbering, filing, storing, and retrieving family lineages both indefinitely into the past and indefinitely into the future without re-structuring or re-copying, and to encourage the compilation of family history, records, and memorabilia. The non-patentable portion which uses the numbering, filing, and storing aspects of the invention also encourages in-depth recording of personal data for individuals including medical history against future reactions and the developing of a base-line for future genetic counseling to benefit both the current and future generations.

The compact form of the invention eliminates all unnecessary pieces of paper while still providing adequate space for recording each generation. This allows the lineage file to be used as a research tool as well as permanent records so no re-copying of information is necessary. The one inter-locking indexing system can be kept up-to-date without re-copying, thus many potential chances for errors of copying are avoided.

8 Claims, 1 Drawing Figure

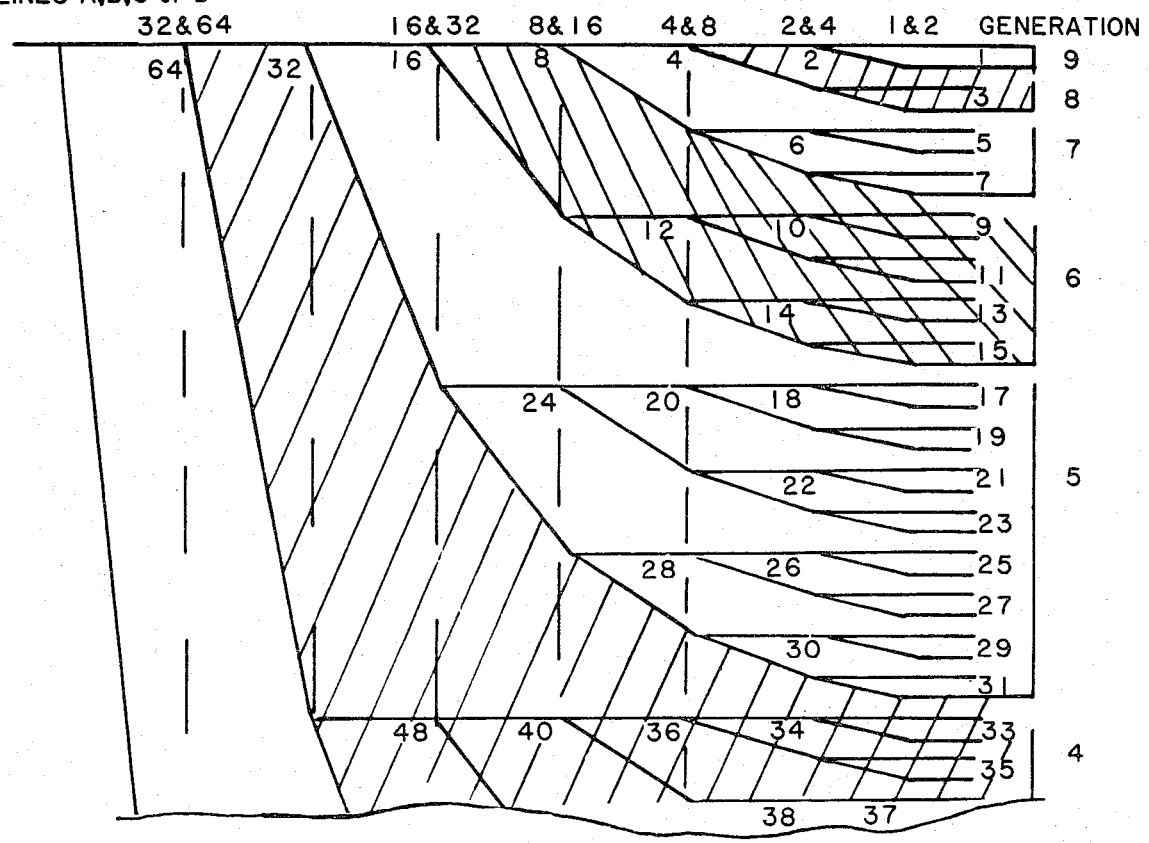
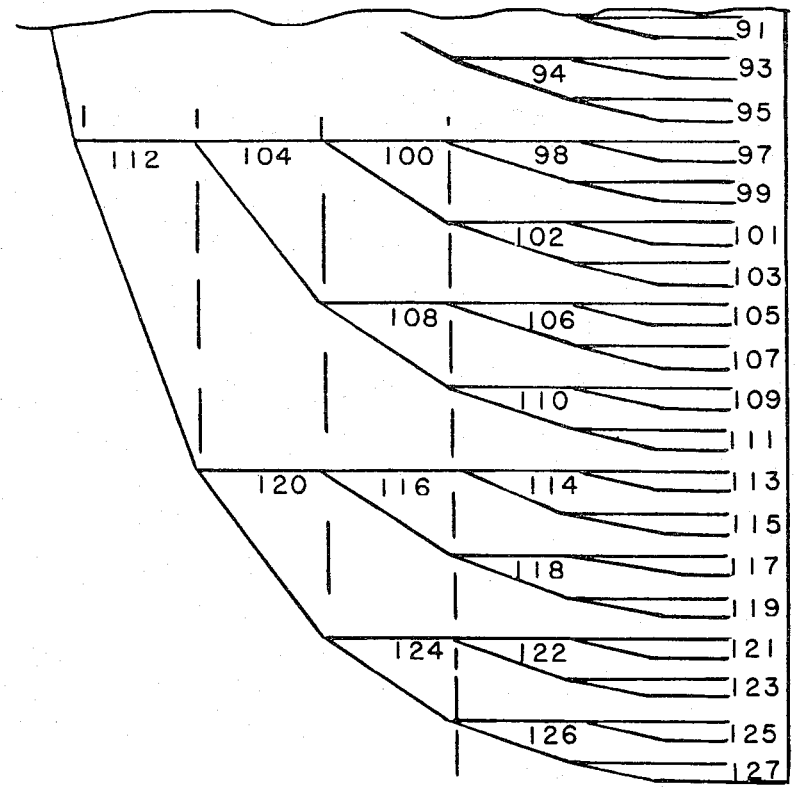

4,501,559

BASIC COMPREHENSIVE GENEALOGICAL AND FAMILY HISTORY SYSTEM OF STRAIGHTLINE GENEALOGY

FIELD OF INVENTION

This invention relates to recording, filing, numbering, and indexing genealogical and family history information.

DISCUSSION OF PRIOR ART

Background

Heretofore, actually for as far back as we know, man has kept record of his antecedents. Primitive tribes without writing have throughout many cultures and centuries kept careful oral genealogical histories. Early written records are available, for example, the begats and the begots of the Judeao-Christian Bible. They take up considerable space and have outlasted centuries. From the early writers and philosophers we are told that man needs to know where he has been to be able to go ahead.

The geometric expansion of the world's population and the mobility of our cultures tend to create "lost" generations, separated from familial ties, unless a deliberate effort is made to record and to manitain family histories. Public records by the very demand for their use are becoming increasingly difficult of access. Families need to keep their own records.

During the Korean situation, for instance, the Federal Government discovered that our men as prisoners of war who knew their family histories did not break under brainwashing conditions as did those men who did not know their family histories. A healthy knowledge of ones family history plays a part in improving stability and very possibility adding to mental health. One who feels himself to be a part of a chain develops a better sense of self-worth and purpose more easily than does a person who feels isolated and alone.

The charts and forms most commonly in use today are merely slight variations on charts which evolved two or three centuries ago and which necessity has now allied with supplemental forms for recording a family as a group but without real system for filing and storing as a unified whole. Some bound books provide limited system and some highly expensive electronic programming set-ups promise usually more than they can provide once they are in the hands of the user.

Actual Prior Art in Current Use

The genealogical records currently in general use do not provide for:
indefinite extension into the past and into the future without re-structuring, re-copying, or re-numbering,
quick retrieval of all records brought into a connection by a marriage or union,
visual *straightline* as far back or forward as data is known, between any two persons in line descent-ascent,
such a simple numbering system going indefinately into the past and into the future,
a system providing equal and adequate space for each generation with a minimum number of pieces of paper,
a single indexing system which can be kept up-to-date without re-copying.

OBJECTS

Accordingly, several objects of our invention are that it provides:
1. Indefinite extension for recording genealogical data from into the past and into the future without re-structuring, re-numbering, or without re-copying generations
2. Equal and adequate space for recording data on each generation
3. Minimum number of pieces of paper
4. Orderly filing and numbering by a logical pattern without using "blanks" or incompleted charts to "hold" space
5. A simple numbering system—no matter how far back nor how far into the future—never more complicated than four simple components although extensive collateral filing may add a further component if desired. For example, V Ter 1A indicates a marriage 45 generations back or i Gri 2B indicates a marriage two generations into the future (from the establishment of the genealogy)
6. Equal space and incorporation into the filing system for:
    Data on ancestors of spouses of "future" marriages
    Data on multi-parent families and their lines
7. Equal space and orderly filing of data on collateral lines for continuing generations if so desired
8. A method to avoid excessive duplication of recording of lines where common ancestry is found
9. A visual *straightline* between any two persons in direct line, no matter how many generations apart
10. A compact, easily carried unit which allows the charts to serve both as working papers and as permanent records without re-copying, therefore creating fewer chances for error in copying
11. Almost instant retrieval of all lines brought into the connection by a marriage or union, thus providing a simple method of correction of previous errors, or for pulling lines for reference, study, or for exchanging with other genealogists
12. A "paper computer", the hard copy for a computerized genealogy at no extra cost, work, or re-copying except to feed it into the computer
13. By way of its generation-tabular system, an almost automatic method of detecting and preventing misplacemant errors
14. A place and method of filing family history papers and memorabilia to encourage the development of a rich resource for present and future generations to feel the stabilizing influence of being part of a chain rather than just being a sole entity
15. An inter-locking indexing system which can be constantly up-to-date without re-copying and which can be produced at a cost within the range of anyone
16. A solution to each known generalogical recording "problem".

BRIEF DESCRIPTION OF THE DRAWING

The FIGURE shows the genealogical chart which forms part of this invention, with some middle generations deleted for simplicity and ease of illustration.

DESCRIPTION

Essential Process

Two forms carry the essential structure of the basic process:

Basic Surname Chart—standard size will be 8½"×14", but the size is not critical, it may vary. The top portion of the chart is divided into approximately equal vertical columns. The standard number will be nine. The far left column is slightly wider than the others to carry, to its far left, labels for the contents of the approximately nine horizontal lines which cross the vertical columns. These labels include:
husband
birth date
birth place
death date
death place
wife's maiden name
her father's name
her mother's name
a reference blank. The rest of the chart is blank except for brief instructions, identifying markings, and spaces in the upper left corner and on the right side just below the columns, for numbering the chart.

Individual Family Chart—its size is the same as that of the aforementioned Basic Surname Chart, and the top portion is identical with the top of that chart, including the space to the far right just below the columns for numbering the chart. The lower, major, portion of the chart provides for recording genealogical information for a complete single family unit, sources of information, simple instructions, and identifying markings.

(For persons already deeply committed to the "family group sheet" approach, a separate kit will carry "glue-on" columns to be fastened at the top of the traditional form to convert to this system. A similar adjustment will create a Basic Surname Chart for the set.)

A third chart, Personal Information Chart, will be used with these.

Supplemental Process

The interlocking indexing system is a supplemental process and is comprised of sheets of index slips either printed, to be hand cut, or die cut and perforated. The standard horizontal width of the slips will be one-third of a standard sheet of paper, eight and one-half inches. This width may vary according to planned use. Weight and type of paper stock will vary according to proposed use and width.

The height, or length, of individual slips will vary. The standard length will be from just under an inch to about three or four inches.

Basically each slip is a rectangle with three slits in it, two matching slits on either side equidistant down (about ¼") from the top and cutting in from the sides toward the center forming two tabs, about five-eighths to seven-eighths inches long. The third slit is centered, the same distance from the bottom as the other two are from the top. This slit reaches closer to the side edges than do the ends of the upper slits.

Broadening Paragraph

While the above description includes much specific information this should not be construed as limitations on the scope of the invention but rather as an example of one preferred embodiment thereof. Many other variations may be applied: the Individual Family Charts my be die-cut to provide the generation-tabular effect, the index system may be color keyed for the four main surname lines of the genealogy, etc. Accordingly the scope of the invention should be determined by the appended claims and their legal equivalents.

OPERATION

Completion of Charts

Background—The Basic Surname Chart carries a "span" of generations. The number of generations in a span may vary but the optimum number seems to be nine. The number of columns at the top of the chart determines the number of generations in a span.

The Basic Surname Chart (BSC) is the first form to be completed. In the columns across the top, the husbands of successive generations of the male surname line of the span are listed, with their basic genealogical data, their wives' maiden names, and the names of her parents. The latest, or current, generation is to the far left, working one column to the right going back. (In "future" spans the first generation is in the column to the far right, moving to the left one column per generation in that male surname line.)

Each marriage, or union, and the resulting family unit, is recorded on an Individual Family Chart (IFC). To complete the columns at the top of the chart it is centered over the BSC but down from the top so the columns of the IFC are directly under those of the BSC. The wife's maiden name is written on the space that will cover her name on the BSC when the charts are filed.

The space above her name and any columns to the left are cut away, if die-cut forms are used the form for the correct generation would have been selected. The next column to the right of her name begins the recording of her father's surname line just as her husband's surname line was recorded on the BSC. In effect, then, the top of each IFC serves as a BSC for the female line as it is brought into the connection.

The tab effect created by cutting away the space above and to the left of the wife's name produces "filing tabs" for quick recovery of the family unit desired as well as all other lines brought in by that union.

Filing of Charts

Background—In nine generations, a total of 511 marriages or unions are brought into connection.

| Generation: | 1 | 2 | 3 | 4 | 5 | 6 | 7 | 8 | 9 |
|---|---|---|---|---|---|---|---|---|---|
| Number of Marriages: | 1 | 2 | 4 | 8 | 16 | 32 | 64 | 128 | 256 |

One more than one-half of the total number of marriages or unions, then, in a span of generations are in the furthest back generation. The marriage of this last generation does not bring additional marriages into the span for the parents of both partners of that generation would be found in the tenth generation—in the next span. From that generation forward, however, an increasing number of marriages are brought into the connection by the marriage of each generation.

| Generation: | 1 | 2 | 3 | 4 | 5 | 6 | 7 | 8 | 9 |
|---|---|---|---|---|---|---|---|---|---|
| Marriage of that generation plus others brought in by it; | 256 | 128 | 64 | 32 | 16 | 8 | 4 | 2 | 1 |

Actual Filing—The Bsc of the span is, in a sense, the backbone of the span. All IFC are filed against it.

In filing the charts against the BSC, the IFC for the marriage of the furthest back know generation is filed immediately in front of it. For subsequent generations, the IFC is filed immediately in front of all charts brought in by the marriage of the previous generation. As further generations are known they are inserted by following the same pattern.

The same principle is followed in filing the IFCs against IFCs as well as against the BSC.

Numbering of Charts

Background—In any generation, one-half of the ancestors of the children of that generation are ancestors of their father and one-half are ancestors of their mother, that is—of the husband and wife of that generation.

Carrying that back one further generation one-fourth of the children's genetic inheritance comes from each of their four grandparents—but by and large in our culture they receive only one *surname*—that of their father.

They receive one-half of their genetic inheritance from their mother but in her particular line her maiden surname is "lost" when she marries. Exceptions: Now some women are legally retaining their maiden names, or in some instances maiden surnames are being incorporated with the husbands' as in hyphenation, or as with the Spanish custom. An example, when Becky Rutland and Robert Brown were married, she retained her name legally. Their children, by court action carry the surname Rutland-Brown. When Becky's sister married both she and her husband assumed a hyphenated name.

For numbering:

A—Male surname of the span (and of the husband of the first generation marriage)

B—his mother's surname, "lost" when she married his father in the second generation C—Maiden surname of the wife of the first generation "lost" with that marriage D—her mother's surname, "lost" with her second generation marriage.

The male surname of the span continues throughout the span as well as into past spans and possibly into a future span if male children of generation one have issue. In each complete nine generation span the male surname "absorbs" 511 female surname lines.

Actual Numbering

Each span carries two designator elements. One indicates the relative position of the span in the genealogy and the other gives an alphabetical code or surname indicator for filing beyond the numeric positioning.

The first is a Roman numeral, I, II, III, etc., going back, or i, ii, etc., going into the future. This indicator places the nine generations of the span within the framework of the total genealogy. The second indicator is composed of the first three or so letters of the male surname of the span. This alphabetizes the spans within the numerical designators. For example, I Gri is the first span of a Griswold genealogy. II Cla, II Gri, II Ter, and II Woo are all second spans going back in that same genealogy. Going into the future i Bro and i Gri might be first future spans in that same genealogy.

Each of the four main surnames of the span carries the designator, A, B, C, or D as indicated previously. Each of these designators pertains to the line itself and to every other line brought into the connection by marriages or unions into it.

The marriage of the first generation in a span is between the husband of the male surname line, line A, and the wife, a daughter of line C. The record of the family produced by their marriage is recorded on the Individual Family Chart which records her maiden surname line in the top columns; therefore, that chart is designated by the span indicators plus C. For example, I Gri C or II Ter C.

In the second generation are two marriages. The daughter of line B marries into line A, and the daughter of line D marries into line C. Following the same reasoning, then, the chart on which the husband of the first generation appears as a child is designated B and the chart on which the wife of the first generation appears as a child is designated D. For example, I Gri B and II Woo D.

From the third generation on back to the ninth, the numbering requires a fourth element—a number in Arabic numerals. Since the marriages from here, third generation, back are in quadruple, each number is repeated four times. The designator is to indicate a relative position of the marriage it represents. See the following chart.

From the chart, the Arabic number designator of each marriage directly into one of the four main surname lines from the third generation on back (In "future" spans, for the first six generations) is indicated by the appropriate one of the following encircled numbers:

| Generation: | 3 | 4 | 5 | 6 | 7 | 8 | 9 |
|---|---|---|---|---|---|---|---|
| Chart Numbers: | ⓖ₄ | ㉜ | ⑯ | ⑧ | ④ | ② | ① |
| Chart Numbers Brought In: | 65-127 | 33-63 | 17-31 | 7-15 | 5-7 | 3 | |

The numbers below the encircled numbers are those designating lines brought into the connection by that marriage into one of the four main surname lines. For example, I Gri 64A, the third generation marriage into the male surname line, brings with it 63 surnames whose chart designators range from I Gri 65A to I Gri 127A.

Note: The marriage of any ninth generation (or the final generation on the chart if of a different length) does not bring any additional surnames into the span because the parents of the last generation couple will be found on the next span.

A Further Note: All last generation designators are odd numbers and all odd numbers represent last generation marriages.

For example; In a Griswold genealogy:

| 6th | 7th | 8th | 9th |
|---|---|---|---|
| John$_{II}$ Griswold | John$_I$ Griswold | Thomas$_{III}$ Griswold | Thomas$_{II}$ Griswold |
| m | m | m | m |
| I Hannah Dudley | Mary Burgess | Ann Graves | Sarah Bradley |

Since the parents of both partners in the ninth generation union are to be found in the next spans—II Gri A and II Bra A—no additional unions are brought into the connection in this span by this marriage. Since this is the furthest back union in the main surname in this span, the chart for this marriage is placed directly in front of the BSC and since no other chart will ever be put between the two, this IFC is numbered I Gri 1 A.

The eighth generation marriage into the line brings an additional chart into the span, the chart of the marriage of her parents, Elizabeth Stevens and John E. Graves. Since the chart of Ann's marriage will go directly in front of the total number of charts brought into the connection by the marriage of the previous generation, it is numbered I Gri 2 A and since the chart for her parents' marriage will go directly in front of that i is numbered I Gri 3 A.

The seventh generation marriage in that line is that of Mary Burgess and John$_I$ Griswold; their chart is designated I Gri 4 A and is filed directly in front of I Gri 3 A. This seventh generation union brings in a potential of three additional charts—Mary's parents and her two sets of grandparents.

The columns at the top of the IFC of Mary and John's marriage show the two generations of the Burgess family prior to Mary's. The ninth generation, which is the first to be filed, shows Thomas$_I$ Burgess and his wife Mercy Wright. Their chart, then, is numbered I Gri 5 A. Mary's parents, of the eighth generation, were Thomas$_{II}$ and Hannah Dodd; their chart is numbered I Gri 6 A and of course is filed directly in front of the chart showing the union of Mercy and Thomas$_I$.

The next chart to be filed, is that of Hannah Dodd's parents of the ninth generation so that chart is numbered I Gri 7 A, thus completing the charts of marriages brought in by that seventh generation marriage into the main surname line.

The chart of the sixth generation marriage, then, is placed directly in front of that last chart and is numbered I Gri 8 A. By subtracting the arabic number of the chart of a marriage into a line from the number of the chart of the next succeeding generation in that line, the number of charts potentially brought into that span is determined.

Among the charts brought into the span by the next marriage, I Gri 8 A, the chart showing the marriage of Hannah Dudley's parents, Caleb and Hannah Evarts Dudley, lists in the columns Hannah Evart's father and grandfather, John and Samuel Evarts, but her mother and grandmother are unknown. So long as no siblings are known no charts need be made for these unions. Potentially those charts would be numbered 13 A, 14 A, and 15 A but determining the number of the marriage into the fifth generation, I Gri 16 A, the numbering is not held up by these missing charts.

Completion of Indexing Slips

These slips may be used for any type of indexing—different approaches may be used in completing the slips for this genealogical system.

The slips may be handwritten, hand printed, or typewritten. Black ink is recommended if the index is to be photo-copied. If to be typed, a whole sheet or a strip may be inserted in the machine for greater convenience although a single slip may be used.

The name of the wife who brings the surname into the connection is entered at the top left of the slip. Her maiden surname, or family designator if before consistent use of surnames, is entered first, to be followed by her full given name, or in some instances, the name which she is commonly known. On the far right, the full index designator of the Individual Family Chart on which her marriage is recorded is added.

Listed under her given name are the given names of her male ancestors of that surname beginning with her father and going back as far as is known. If this line extends on to additional spans, the designator of the next span is listed on the right opposite the name of the first generation on the span. Additional slips may be added to the first without repeating the surname but as a precaution the surname is to be written on the reverse of the slip.

Collateral lines may be indexed by maintaining a separate index strip or a distinctive color of slips may be used.

Interlocking Index Strip

Once a slip has been completed, it is ready to be inserted in the interlocking index strip.

One slip fastens onto another by bending both slips slightly, inserting the upper tabs of one into the lower slit of the other, then by sliding the lower slip to center it.

If a slip is to be inserted into an already interlocked strip—the slip below the point of the new connection is disconnected by reversing the abovementioned procedure, then the new slip is connected and the lower slip is connected to the new slip.

The interlocked strip may be kept in one long roll and used directly as a reference. Perhaps a more efficient way is to divide the strips into 17 inch lengths. Three of these to a sheet of 11" by 17" can be photo-reduced to a legal sized piece of paper.

We claim:

1. A process of recording, numbering, indexing storing and rapid retrieval of genealogical records to produce a rich and lasting family history resource using minimum numbers of pieces of paper, with indefinite extension into the past and into the future without restructuring, re-numbering, or re-copying, and which provides equal and adequate space for recording the information for each generation, including the provision for multi-parent and adoptive families as well as for the ancestors of these and for ancestors of spouses of future generations by providing:

A. a Basic Surname Chart (BSC) for recording a span of successive generations of a male surname line in equal-sized columns across the top of the chart, each one of which is for recording the male of that generation of that line, his birth and death dates and places, and the names of his spouse and her mother and father;

B. Individual Family Charts (IFC) to record each union in the span for which data is known and successive generations of the wives' surname lines in equal-sized columns across the top of the chart corresponding to those on the BSC, and providing space for information about the individual family units resulting from the above-mentioned union; and C. Personal Information Charts (PIC) used to record precise personal information about individual family members.

2. The process of claim 1 wherein the charts are formed either by cutting or by using die-cut stock to provide very rapid retrieval of information on any generation.

3. The process of claim 1 further comprising numbering the generations and generations of spouses according to the point of their entering the connection by means of Roman numerals and the first three digits of a male surname with an Arabic number and/or a single alphabetic designator added to give each generation its own unique number and which number appears on all records of that generation for easy reference.

4. The process of claim 3 further comprising indexing each person of each generation according to said numbering system for easy retrieval of the genealogical records by means of rectangular, interlockable slips of variable sizes and weights of paper or plastic with two upper tabs on each created by two horizontal, equal slits, in from either side, equidistant down from the top of the slip to be inserted into a lower, centered, overlapping slit near the bottom of the slip next above to form an interlocking easily changed chain of slips; connected strips or sheets of the slips may be either die-cut and perforated or printed to be cut by the user.

5. The process of claim 1, wherein said genealogical records are converted from established genealogies of family group type sheets without having to recopy the data from the old sheets comprising the step of gluing the family group type sheets onto the charts of claim 1 in order of the surname line.

6. The process of claim 5, wherein the charts are formed either by cutting or by using die-cut stock to provide very rapid retrieval of information on any generation.

7. The process of claim 6, further comprising numbering the generations and generations of spouses according to the point of their entering the connection by means of Roman numerals and the first three digits of a male surname with an Arabic number and/or a single alphabetic designator added to give each generation its own unique number and which number appears on all records of that generation for easy reference.

8. The process of claim 7 further comprising indexing each person of each generation according to said numbering system for easy retrieval of the genealogical records by means of rectangular, interlockable slips of variable sizes and weights of paper or plastic with two upper tabs on each created by two horizontal, equal slits, in from either side, equidistant down from the top of the slip to be inserted into a lower, centered, overlapping slit near the bottom of the slip next above to form an interlocking easily changed chain of slips; connected strips or sheets of the slips may be either die-cut and perforated or printed to be cut by the user.

* * * * *